United States Patent [19]

Staehle

[11] 4,277,133
[45] Jul. 7, 1981

[54] MICROSCOPE

[75] Inventor: Dale O. Staehle, Racine, Wis.

[73] Assignee: Western Publishing Company, Racine, Wis.

[21] Appl. No.: 23,058

[22] Filed: Mar. 22, 1979

[51] Int. Cl.³ .............................................. G02B 21/24
[52] U.S. Cl. ........................................ 350/90; 350/92
[58] Field of Search ....................... 350/40, 43, 44, 83, 350/84, 85, 90, 92

[56] References Cited

U.S. PATENT DOCUMENTS

| 1,829,614 | 10/1931 | Schier | 33/275 R |
| 3,608,998 | 9/1971 | Rinker | 350/42 |

FOREIGN PATENT DOCUMENTS

| 151 of 1881 | United Kingdom | 350/85 |
| 3092 of 1906 | United Kingdom | 350/90 |

*Primary Examiner*—John K. Corbin
*Attorney, Agent, or Firm*—Beveridge, DeGrandi, Kline & Lunsford

[57] ABSTRACT

A microscope in which the lens assembly and viewing stage can be positioned at any of several predetermined angular orientations for ease of viewing, the lens assembly includes a zoom magnification capability, and two slides can be pivotably mounted on the viewing stage for alternative positioning in the lens viewing zone without removal of the viewer's eye from the viewing lens, permitting rapid comparison of specimens. A base member has a curved channel, and a frame member has a curved portion with curvature matching that of the channel, permitting the frame member to be positioned on the base member with an adjustable angular orientation. A locking pin passes through an opening in the frame member and rests in a groove in the base member to retain the frame member at a predetermined angular orientation. An eyepiece has a scalloped lower surface to provide cam portions, and an eyepiece engaging member has ribs which cooperate with the cam portions to alter spacing between the viewing lens and the objective lens as the eyepiece is rotated on the eyepiece engaging member, thereby providing zoom magnification. The viewing stage has a number of holes circumscribing the viewing zone. Each of a pair of swing slides has a peg, positioned in a hole of the viewing state, and a viewing area. The two swing slides can be pivoted to alternatively position the viewing area of each within the viewing zone.

11 Claims, 6 Drawing Figures

MICROSCOPE

BACKGROUND OF THE INVENTION

The present invention pertains to microscopes. More particularly, the present invention pertains to a low cost, durable microscope having an adjustable angular orientation and a zoom magnification capability and permitting rapid alternating between two specimens without requiring tedious alignment or focusing each time the two specimens are interchanged.

A trade-off between quality and economics has long been necessary in the microscope industry, particularly with regard to microscopes for uses such as laboratory teaching aides in elementary and secondary schools where costs, being borne by the public, dictate that expenditures for such items as microscopes be kept as low as practical.

Major cost factors involved in the manufacture of microscopes are associated particularly with three elements, good quality lenses, precision focusing apparatus, and durable materials for assuring a long life of the microscope even under abusive handling. Attempts have been made to manufacture microscopes employing synthetic materials, e.g. plastics; however, these attempts have usually represented the making of undesirable trade-offs between quality and economics.

Frequently a microscope is used to compare one specimen with another in, for example, classes in biology. Conventional microscopes are cumbersome in this respect, in that the viewing and comparing of two different specimens require that each time a comparison of a different feature of the specimens is to be made, the two slides on which the specimens are mounted must be interchanged on the stage of the microscope, with attendant realignment of the specimen in the field of view.

It is often desired to study in detail the appearance of a particular portion of a specimen on a slide, which has been identified while being viewed through a microscope. In a microscope having a plurality of objective lenses, each offering a different magnification, the only method of enlarging the view of a specimen is to change to a higher power objective lens, causing disruption of the field of view, and often causing the viewer to have to resort the renewed alignment and focusing. By the time the user has gotten the specimen in view, he may have forgotten his mental image of the specimen under the prior objective lens. These difficulties hinder the educational process when such microscopes are used as teaching tools in schools, and generally they have caused the use of microscopes to be unduly burdensome.

Use of a microscope for an entended period of time, for example during comparison of various specimens or during close, detailed study of specimens, can be fatiguing, particularly if the microscope is not angularly oriented for greatest comfort.

SUMMARY OF THE INVENTION

The present invention is a versatile microscope which can be manufactured of high quality, durable components that, nevertheless, are comparatively low in cost. In accordance with the present invention, synthetic plastics, such as general purpose polystyrene, impact polystyrene, polypropylene, and foamed polypropylene, can advantageously be used to manufacture components of the microscope, without significantly sacrificing the quality or durability of the resulting device. Such synthetic plastics can advantageously be used in the microscope of the present invention because the structural arrangement of the components is such as to be accurate, durable and reliable, as well as being inexpensive when formed by a molding process.

The microscope of the present invention allows the user to position the viewing lens at a predetermined, comfortable viewing angle and compare the views of different specimens on different slides, without having to remove his eye from the eyepiece to manipulate slides onto and off of the viewing stage. Additionally, the use of the microscope of the present invention obviates the need to change objective lenses to increase the magnification for study of a portion of a specimen, with resultant realignment and refocusing. To this end the microscope of the present invention is provided with a zoom eyepiece lens, so that a user may quickly enlarge his view of the specimen he is studying, without losing actual sight of the specimen. Nevertheless, the microscope, including this zoom lens feature, is formed of low-cost, durable materials.

In accordance with the present invention, a microscope is provided having a base member with one or more pin receiving grooves, a D-frame support member with a plurality of pin receiving holes throughout the curved portion of the D, a pin cooperating with these grooves and holes to retain the D-frame support member on the base member at a desired angle of orientation, a viewing stage movably fixed to the straight portion of the D, the viewing stage provided with a circumferentially-arranged plurality of holes for receiving slide-retaining or slide-bearing members and also provided with an illumination device, an optics section movably mounted on the straight section of the D-frame support member and including an objective lens, an eyepiece-engaging member with a rib oriented approximately parallel with the straight section of the D, and an eyepiece provided with cams around its internal circumference so that the cams and the rib engage as the eyepiece is rotated, thus altering the distance between the lens of the eyepiece and the objective lenses to alter the magnification provided by the microscope.

BRIEF DESCRIPTION OF THE DRAWINGS

These and other aspects and advantages of the present invention are more apparent from the following detailed description and claims, particularly when considered in conjunction with the accompanying drawings in which like parts bear like reference numerals. In the drawings:

DETAILED DESCRIPTION OF A PREFERRED EMBODIMENT OF THE INVENTION

Figure 1:
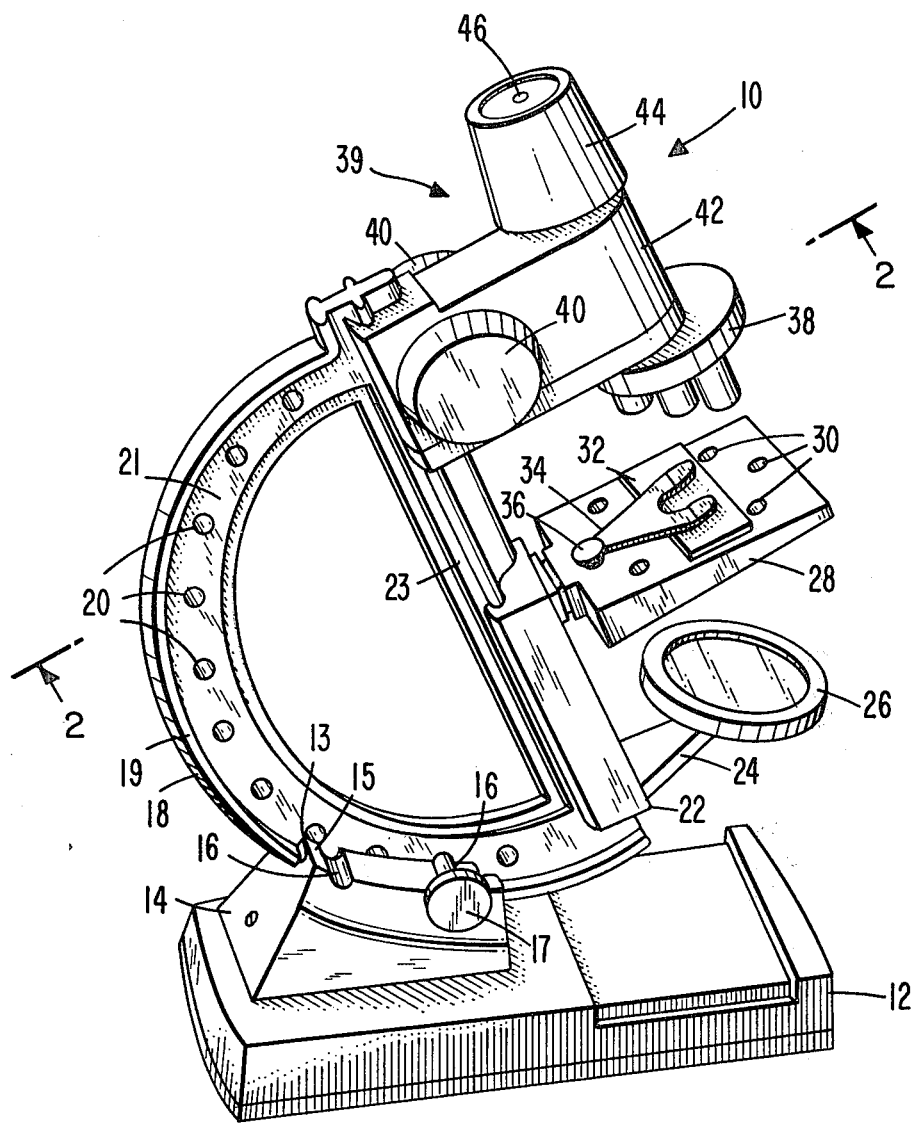
FIG. 1 is a perspective view of a preferred embodiment of a microscope in accordance with the present invention.
Figure 2:
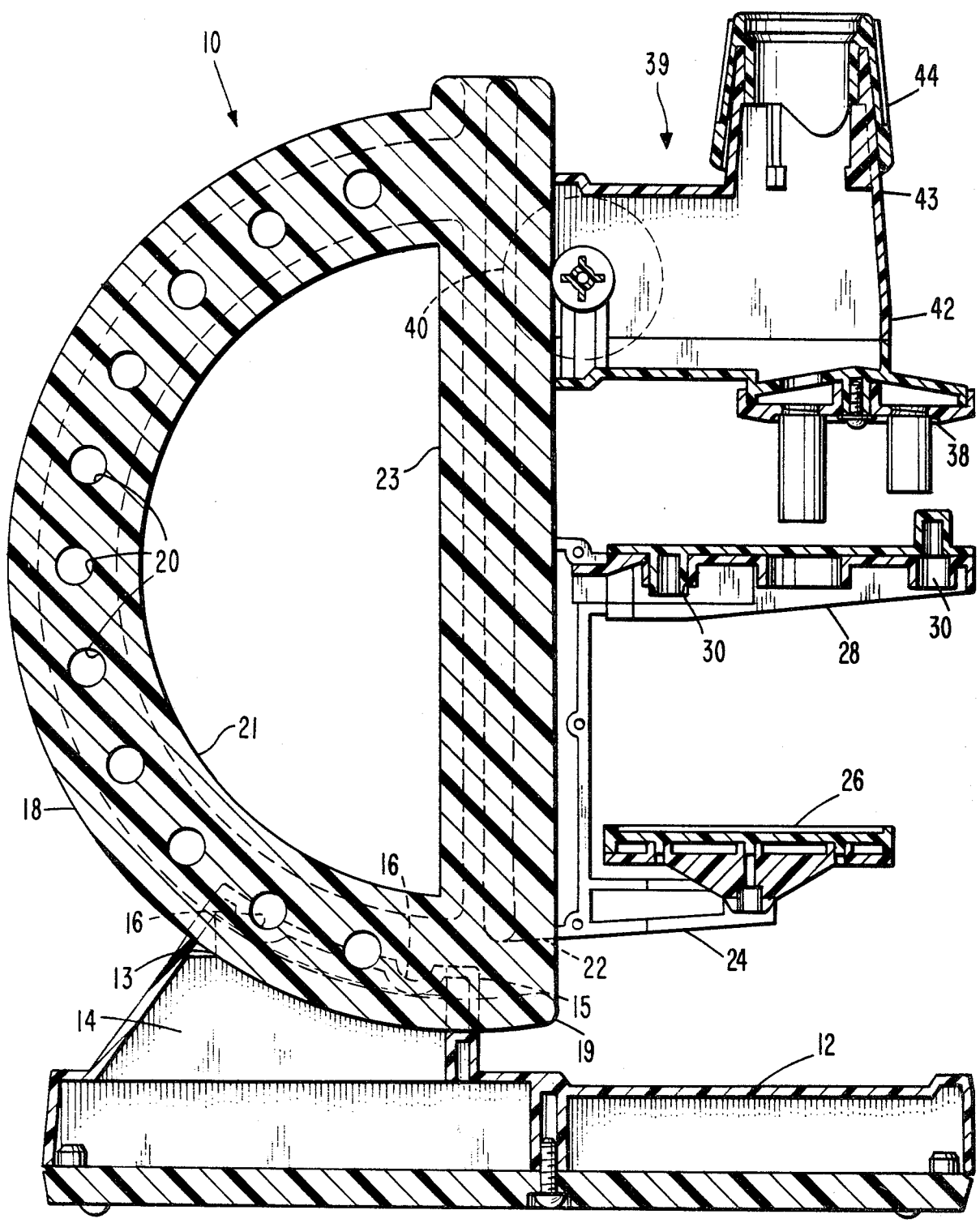
FIG. 2 is a cross-sectional elevational view of the preferred embodiment of FIG. 1, taken generally along line 2—2 of FIG. 1.

In the preferred embodiment of the invention depicted in the drawings, microscope 10 is provided with a base 12 having a support shoulder 14 thereon. Support shoulder 14 is provided with a channel 13 in which the curved portion 21 of a D-frame member 18 may be fitted, as depicted in FIGS. 1 and 2. Channel 13 of shoulder 14 is curved to match the curvature of curved portion 21. Shoulder 14 is provided with lips 15 which partially overhang channel 13. Curved portion 21 of D-frame member 18 is provided with two rims 19 extending on either side thereof, and when D-frame member 18 is fitted on shoulder 14, rims 19 underlie and engage lips 15. The cooperation of lips 15 and rims 19 prevents removal of D-frame member 18 from channel 13 except by continued rotation of D-frame member 18. On the other hand, microscope 10 may be stored partially disassembled by rotating D-frame member 18 out of channel 13, when desired.

Shoulder 14 is provided with one or more grooves 16, extending across the upper surface of shoulder 14, substantially perpendicular to channel 13. Preferably two grooves 16 are provided; however, any number of grooves may be provided. The curved portion 21 of D-frame member 18 is provided with a plurality of holes 20 spaced apart a distance different from the spacing between grooves 16. Preferably, the angular spacing between adjacent holes 20 is on the order of about two-thirds the angular spacing between adjacent grooves 16, for example with holes 20 being spaced at angular intervals of 15° and grooves 16 being spaced at angular intervals of 22.5°. When any of the grooves 16 is aligned with any of the holes 20, a pin member 17 may be positioned to rest in the groove and pass through the aligned hole, retaining D-frame 18 in a predetermined angular orientation on shoulder 14 of base 12. By selecting the distances between grooves 16 and holes 20 to be different, a larger number of angular orientations of the microscope stage and optics on the base can be achieved. Rotational increments in the order of five degrees are feasible and may be found desirable. The multiplicity of increments allows the user to view from a comfortable, convenient angle.

D-frame member 18, support shoulder 14, and base 12 may advantageously be made from synthetic plastics, thus decreasing costs, without significantly sacrificing durability or precision. Typically, but non-limitatively, base 12 and shoulder 14 may be molded from impact polystyrene weighted with an insert of foamed polypropylene, while D-frame member 18 and pin member 17 may be molded from foamed polypropylene.

The straight side 23 of D-frame member 18 supports a microscope lens assembly 39. Straight side 23 and assembly 39 are provided with a cooperating gear and pinion, permitting movement of assembly 39 along straight side 23 by rotation of dial 40, in a known manner. Microscope lens assembly 39 includes eyepiece 44, which is provided with a viewing lens 46, and eyepiece-engaging member 42, which is provided with an objective lens grouping 38 that advantageously can include several lenses which are alternatively positionable in viewing alignment with lens 46, although a single objective lens may be provided.

D-frame member 18 has fixedly mounted on its straight side 23 a stage base 22. Stage base 22 supports a mirror arm 24 on which a mirror 26 is mounted. Stage base 22 further supports a microscope viewing stage member 28 which is provided with a plurality of holes 30 arranged in a generally circular array circumscribing the viewing zone on stage member 28 beneath lens assembly 39. As shown in FIG. 1, slide clip 34 may be used to secure a slide 32 in position on stage member 28, by inserting peg 36 of the slide clip into one of holes 30.

Figure 3:
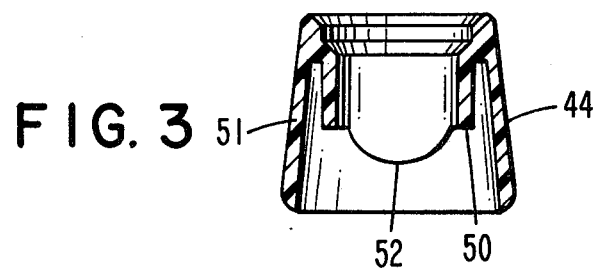
FIG. 3 is a cross-sectional view of an eyepiece suitable for use in a microscope in accordance with the present invention.
Figure 4:
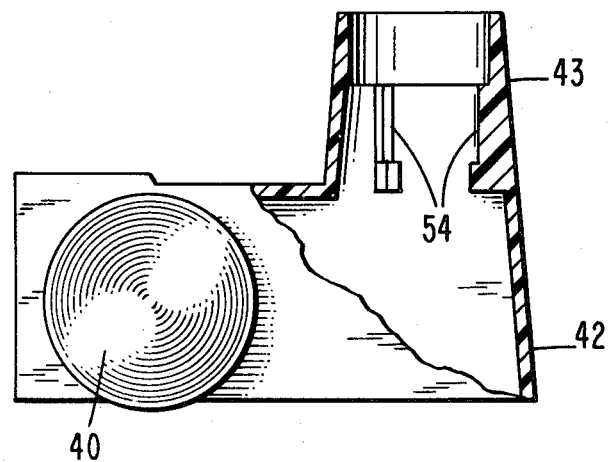
FIG. 4 is a side elevational view, partly in cross-section of an eyepiece-engaging member suitable for use with the eyepiece of FIG. 3.

The arrangement of eyepiece 44 and eyepiece-engaging member 42 to provide a zoom lens capability may be more clearly seen from a study of FIGS. 3 and 4. Eyepiece-engaging member 42 includes an upper cylinder portion 43 having on the interior circumference thereof a number of vertical ribs 54, for example three ribs spaced at substantially equal angular locations about the circumference. Eyepiece 44 is provided with an outer annular wall 51 and an inner annular wall 50 which is spaced apart from outer wall 51 and which extends about half way down the length of eyepiece 44. At their first ends annular walls 50 and 51 are joined together and are closed by viewing lens 46. At its second end inner annular wall 50 is scalloped to provide a plurality of cam portions 52 along its lower edge, for example three cam portions 52 at substantially equal angular locations about the circumference of eyepiece 44. In normal viewing, wall 50 of eyepiece 44 rests on ribs 54 of upper cylinder portion 43, and magnification of the element on the stage is provided by the interaction of eyepiece lens 46 and one of the objective lenses of group 38 acting through the distance therebetween. As eyepiece 44 is rotated on upper cylinder portion 43, cam portions 52 engage ribs 54, thus raising eyepiece 54 by the displacement distance of the cam portions 52. This results in an increased distance between lens 46 and the selected objective lens of grouping 38 and thus provides increased magnification of the specimen under observation and giving a zoom magnification effect.

Eyepiece 44, eyepiece-engaging member 42 and objective lens grouping 38 may be made out of plastics without sacrificing precision or durability. Typically, but non-limitatively, eyepiece 44 and objective lens grouping 38 may be made of polypropylene, supporting the necessary lenses, while eyepiece-engaging member 42 may be made of impact polystyrene. Mirror 26 preferably includes a general purpose polystyrene reflecting member mounted on a polypropylene base.

Figure 5:
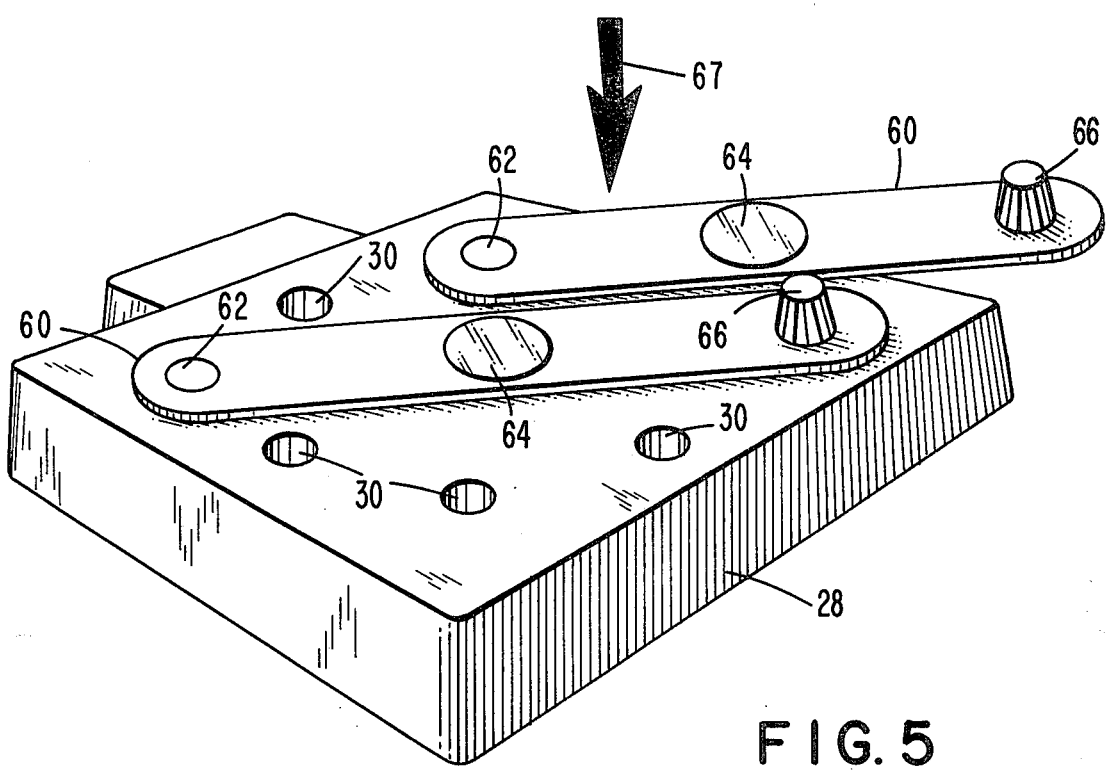
FIGS. 5 and 6 are two perspective views of a preferred embodiment of the stage of a microscope in accordance with the present invention, showing alternate positioning of a pair of slides thereon.
Figure 6:
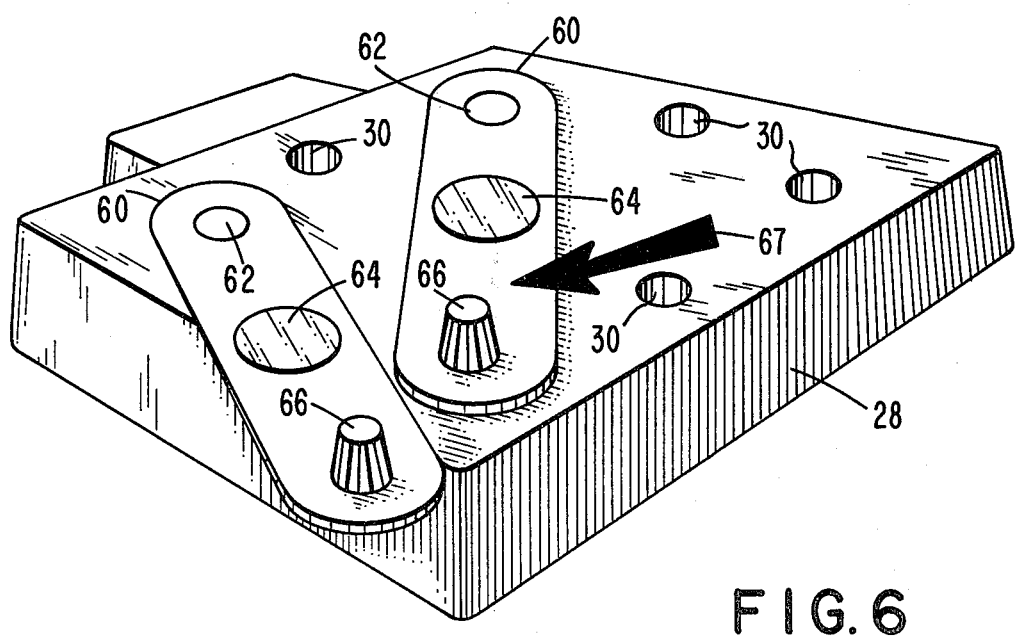

An alternative slide-retaining technique is shown in FIGS. 5 and 6. A pair of swing slides 60 are provided, each having a peg 62 for insertion in one of the holes 30 of stage member 28, and further having a viewing area 64, and a handle 66. Each swing slide 60 may be provided with a permanently mounted specimen in its viewing area 64, if desired. Alternatively swing slides 60 may be provided for temporary mounting of specimens. As shown in FIG. 5, two swing slides 60 are mounted on stage 28 at one time, with one swing slide positionable at any one time on stage 28 within the viewing zone of lens assembly 39 for viewing of the specimen within its viewing area 64. By pushing the handle 66 of the swing slide 60 presently outside the viewing zone to pivot that slide toward the viewing zone, as depicted by arrows 67, the two swing slides 60 may rapidly be moved from the position of FIG. 5, showing the first swing slide positioned in the viewing zone for viewing of its specimen, to the position of FIG. 6, showing the other swing slide positioned in the viewing zone for viewing of its specimen. This permits rapid interchange of the two slides and so aids in comparing different specimens which may be mounted on the two swing slides. By way of example, one of swing slides 60 may be provided with a bee's rear leg in its viewing area, while the other swing slide 60 is provided with a bee's front leg. By using the present invention the front and rear legs may be readily compared, without the necessity of moving slides off of and onto stage 29, which would then likely require adjustments to align the field of focus under the objective lens. In teaching applications this readily aids the educational process.

This design of the various elements of the microscope allows many of them to be made of a plastic material without sacrificing precision or durability. Typically, but not limitatively, stage 28 and slide clip 34 may be made of polypropylene, swing slide 60 may be a general purpose polystyrene, having a textured surface outside of viewing area 64, and stage base 22 may be an impact polystyrene.

It is understood that the foregoing description of the preferred embodiments, as depicted in the drawing, are intended to be illustrative, and not limitative. Thus, although the present invention has been described with reference to preferred embodiments, numerous rearrangements and substitutions could be made within the scope of the invention.

What is claimed is:

1. A microscope comprising:
   (a) a base member having a curved channel therein;
   (b) a D-shaped frame member having a straight side and a curved portion, the curvature of said curved portion substantially matching the curvature of said curved channel to permit said frame member to be positioned on said base member with an adjustable angular orientation;
   (c) means for retaining said frame member on said base member with a predetermined angular orientation;
   (d) a viewing stage mounted on said straight side of said frame member and having a viewing zone;
   (e) a microscope lens assembly including:
      (1) an objective lens;
      (2) an eyepiece-engaging member mounted on said straight side of said frame member and supporting said objective lens, said eyepiece-engaging member having a cylindrical portion with a plurality of ribs;
      (3) a viewing lens; and
      (4) an eyepiece having an annular wall, the first end of said annular wall closed by said viewing lens, the second end of said annular wall being scalloped to provide a plurality of cam portions, said eyepiece rotatably mounted on said cylindrical portion of said eyepiece-engaging member with said viewing lens, said objective lens, and said viewing stage aligned for viewing of said viewing zone through the aligned combination of said viewing lens and said objective lens, said cam portions cooperating with said ribs to alter the spacing between the aligned viewing lens and objective lens as said eyepiece is rotated on said eyepiece-engaging member;
   (f) a first swing slide member having a viewing area;
   (g) a second swing slide member having a viewing area; and
   (h) means pivotably mounting said first and second slide members on said viewing stage for pivoting between a first position in which said viewing area of said first swing slide member is within said viewing zone while said viewing area of said second swing slide member is outside said viewing zone and a second position in which said viewing area of said second swing slide member is within said viewing zone while said viewing area of said first swing slide member is outside said viewing zone.

2. A microscope as claimed in claim 1 and made of synthetic plastics.

3. A microscope as claimed in claim 1 in which:
   said base member is provided with a groove extending substantially perpendicular to said curved channel;
   said frame member curved portion is provided with a plurality of holes passing therethrough; and
   said retaining means comprises a pin for passing through one of said holes while resting in said groove.

4. A microscope as claimed in claim 3 in which said base member is provided with a plurality of substantially parallel grooves extending substantially perpendicular to said curved channel.

5. A microscope as claimed in claim 4 in which the angular spacing between adjacent holes of said frame member is different from the angular spacing between the adjacent grooves of said base member.

6. A microscope as claimed in claim 5 in which the angular spacing between adjacent holes of said frame member is less than the angular spacing between adjacent grooves of said base member.

7. A microscope as claimed in claim 1 in which said viewing stage has a plurality of holes therein circumscribing said viewing zone and said pivotably mounting means comprises a first peg on said first swing slide member and positioned in one of the holes of said viewing stage and a second peg on said second swing slide member and positioned in another of the holes of said viewing stage.

8. A microscope as claimed in claim 1 in which said eyepiece includes an outer annular wall and an inner annular wall, the first ends of said annular walls joined together.

9. A microscope comprising:
   a frame member;
   a microscope lens assembly mounted on said frame member;
   a viewing stage mounted on said frame member and having a viewing zone viewable through said lens assembly and a plurality of hole circumscribing said viewing zone;
   a first swing slide member having a viewing area;
   a second swing slide member having a viewing area; and
   a first peg on said first swing slide member and positioned in one of the holes of said viewing stage and a second peg on said second swing slide member and positioned in another of the holes of said viewing stage for pivotably mounting said first and second swing slide members on said viewing stage for pivoting between a first position in which said viewing area of said first swing slide member is within said viewing zone while said viewing area of said second swing slide member is outside said viewing zone and a second position in which said viewing area of said second swing slide member is within said viewing zone while said viewing area of said first swing slide member is outside said viewing zone.

10. A microscope comprising:
    (a) a frame member;

(b) a viewing stage mounted on said frame member; and
(c) a microscope lens assembly including:
  (1) an objective lens;
  (2) an eyepiece-engaging member mounted on said frame member and supporting said objective lens, said eyepiece-engaging member having a cylindrical portion with a plurality of ribs;
  (3) a viewing lens; and
  (4) an eyepiece having an annular wall, the first end of said annular wall closed by said viewing lens, the second end of said annular wall being scalloped to provide a plurality of cam portions, said eyepiece rotatably mounted on said cylindrical portion of said eyepiece-engaging member with said viewing lens, said objective lens, and said viewing stage aligned for viewing of said viewing stage through the aligned combination of said viewing lens and said objective lens, said cam portions cooperating with said ribs to alter the spacing between the aligned viewing lens and objective lens as said eyepiece is rotated on said eyepiece-engaging member.

11. A microscope as claimed in claim 10 in which said eyepiece includes an outer annular wall and an inner annular wall, the first ends of said annular walls joined together.

* * * * *